April 2, 1935.     A. J. MEYER ET AL     1,996,166
MOTOR VEHICLE
Filed Oct. 22, 1932
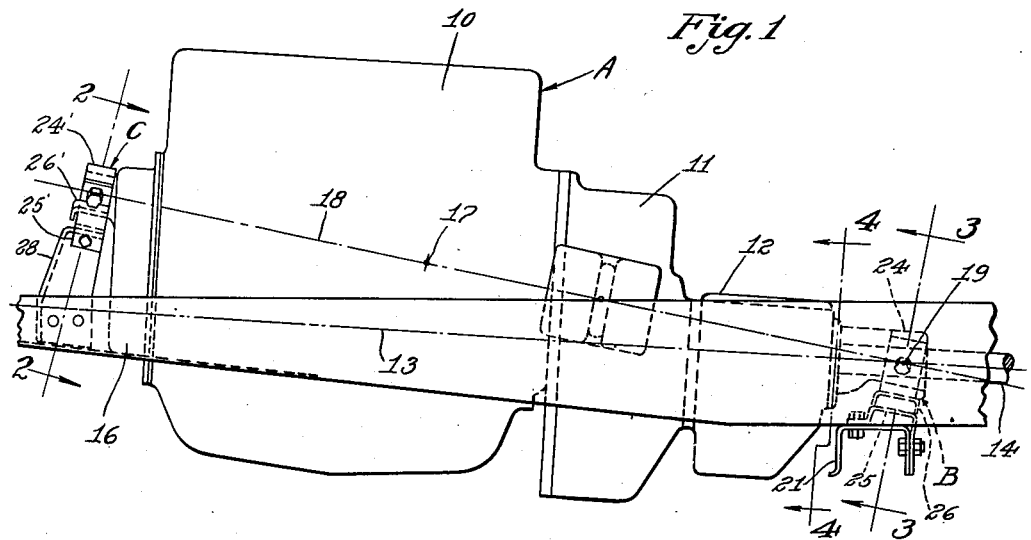
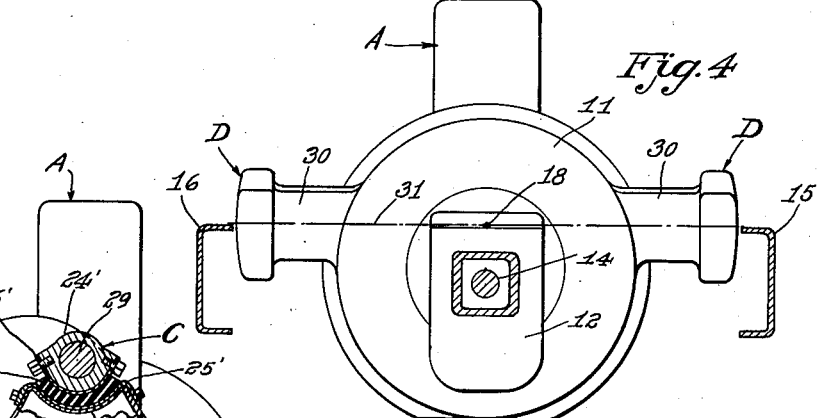
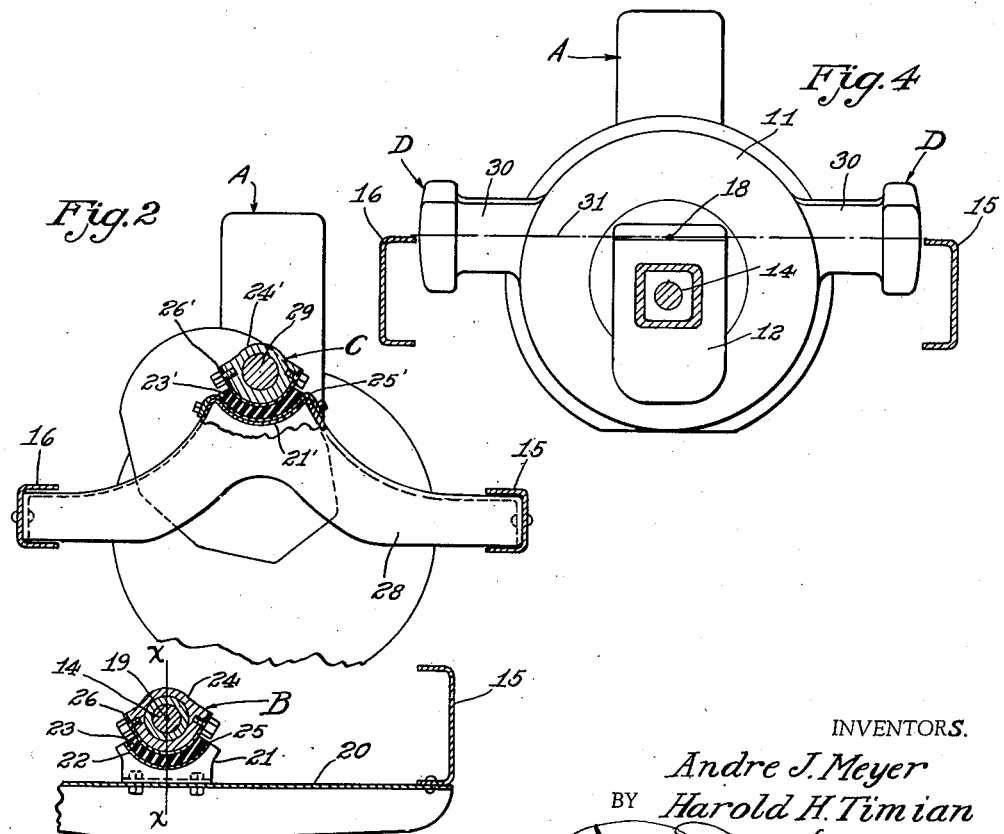
INVENTORS.
Andre J. Meyer
BY Harold H. Timian
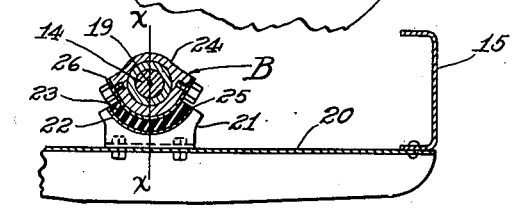
ATTORNEY.

Patented Apr. 2, 1935

1,996,166

UNITED STATES PATENT OFFICE 1,996,166

MOTOR VEHICLE

Andre J. Meyer and Harold H. Timian, Detroit, Mich., assignors to Continental Motors Corporation, Detroit, Mich., a corporation of Virginia Application October 22, 1932, Serial No. 639,016

6 Claims. (Cl. 248—14.2)

This invention relates to motor vehicles and refers more particularly to methods and improvements in balancing and mounting the engine or engine power plant in the vehicle frame or supporting structure.

Our invention relates particularly to motor vehicle power plants and engines of the type subjected to oscillation tendencies about a longitudinal axis extending preferably, though not necessarily, at an angle to the drive shaft of the power plant, under the action of forces including torque reaction inherent in the operation of the power plant. It is an object of our invention to provide improved means for mounting the power plant on the motor vehicle frame whereby to minimize the oscillatory movement and generally stabilize the engine or power plant so that said forces will not be objectionable to the occupants of the vehicle, and further, whereby said forces will not destructively vibrate or shake the engine parts.

Our invention is especially adapted for use in connection with internal combustion engines of the four cylinder type since it is this type of engine which, of those types ordinarily used, is most subjected to torque reactions, vibrations, and other inherent forces which would be transmitted to the motor vehicle in a manner objectionable to the passengers in the event that the engine were rigidly or even yieldingly secured to the frame of the vehicle. We desire to point out however, that our invention is by no means limited to the four cylinder type of engine since other types of engines such as the six cylinder type or eight cylinder type, for example, are readily adapted for use in connection with our invention, although the beneficial results ordinarily obtained in connection with an eight cylinder engine, for example, will not be as noticeable as when our invention is incorporated with an engine having lesser inherent balance such as in the four cylinder engine.

It is a further object of our invention to provide an improved mounting for an engine power plant of the type adapted to oscillate about an axis disposed preferably at an angle to the axis of the engine power shaft, such axis of oscillation preferably passing approximately through the center of gravity of the power plant, said mounting including yielding or resilient front and rear supporting structures between the power plant and the frame of the motor vehicle. Such mountings may be inclined to the axis of the engine power shaft so as to lie substantially in planes perpendicular to the said axis of oscillation whereby to afford freedom of movement for the engine about the axis of oscillation with the result that the motor vehicle operates more smoothly with less vibrations and shocks being transmitted from the engine to the vehicle frame. We desire to point out however, that the broader aspects of our invention are not limited to any particular form or arrangement of mountings for the engine.

A further object of our invention resides in the addition of one or more weights, or the equivalent, to the engine or power plant, in such a manner as to increase the rotary inertia of the engine about its longitudinal axis of oscillation under the influence of torque reactions, said weights having sufficient mass and being located at such distance from said axis of oscillation whereby to absorb the inherent torque reactions without appreciable amplitude. In practice we prefer to arrange said weights so that a line through their centers of gravity passes through the axis of oscillation, in order to avoid setting up additional sympathetic vibrations and other periodicities, but it will be understood that in its broader aspects our invention provides for increasing the inertia of the engine to stabilize its movement against torque reactions and the weight or weights may be located at various points on the engine, either front, rear, or side, or even above the engine, or any combination of these locations.

It is well known that the torque delivered by the engine pistons varies throughout a revolution or cycle of the engine crankshaft, although the engine flywheel tends to stabilize the actual torque delivered from the engine power shaft. However, the torque fluctuations are present and react equally on the body of the engine tending to rock it and oscillate it about a longitudinal axis with varying intensity and direction of oscillation. Our invention resides, in part, in suppressing to a great extent, the actual movement of the engine under the influence of these fluctuating torque reactions, by materially increasing the rotary inertia of the engine mass. In order to minimize the amount of added weight necessary, it is desirable to locate the weight at as great a distance as possible, under any installation, from the engine to which such a weight is attached since the inertia effect is proportional to the square of the distance and only directly proportional to the mass.

We prefer also to provide for mounting the engine in such a manner that a fairly definite longitudinal axis of oscillation is established, through approximately the center of gravity of the engine unit in order to minimize other vibrations and movements of the engine, and such axis preferably should aproximately intersect the axis of the power shaft or projected axis of the crankshaft at one end thereof. By locating such intersection at the rear of the engine or transmission, if mounted as a unit with the engine, the engine rocking and other movements even though slight are minimized at the location of the usual control pedals, gear shift lever, and other parts usually attached to the engine unit and therefore subject to movement therewith.

We further prefer to provide at least a pair of weights extending laterally from opposite sides of the engine. Such weights may be located closely to said intersection of said axis in order to further stabilize the engine at the general location of said engine controls.

The supports for the engine weight are preferably yielding, such as rubber mountings, whereby to absorb slight vertical and other movements and vibrations of the engine without objectionably transmitting the same to the vehicle supporting frame.

In our drawing we have shown the usual transmission as a unitary part of the engine so as to form a unitary power plant having a yielding support at the rear of the transmission located substantially in the vertical plane containing the axis of oscillation.

We have also shown aligned front and rear supporting bearings for the power plant, these bearings preferably lying along the axis of oscillation and preferably being also inclined so as to lie substantially in planes perpendicular to said axis of oscillation. Other supports may be substituted, if desired, within the broader aspects of our invention.

Further objects and advantages of our invention reside in the particular combination and arrangement of parts more particularly hereinafter described and claimed, reference being had to the accompanying drawing in which:

Fig. 1 is a side elevation view of the engine power plant and associated portion of the supporting frame, Fig. 2 is a sectional elevation view of the front motor support taken along the line 2—2 of Fig. 1, Fig. 3 is a detail sectional view of the rear support taken through the line 3—3 of Fig. 1, and Fig. 4 is a sectional view through line 4—4 of Fig. 1 showing the stabilizing engine weights.

Referring to the drawing, reference character A represents the power plant which may consist of the internal combustion engine 10, flywheel and clutch housing 11, and the transmission 12, all of which parts are well known in the art. If desired, the transmission may be mounted separately from the engine itself although the illustrated unitary structure is deemed preferable. 13 represents the center line of the crankshaft for the engine 10, the power being transmitted from this shaft in the well known manner through the transmission 12 and thence to the usual driving wheels (not shown) of the vehicle by reason of the driving shaft 14 extending rearwardly from the transmission 12. The motor vehicle may be provided with the usual side frame members or sills 15 and 16 adapted to support the power plant A and also carry the body (not shown) of the motor vehicle in the well known manner. 17 represents the approximate center of gravity of the power plant A, and the supporting structure for the power plant, as will be presently apparent, is constructed and arranged so that the power plant will tend to oscillate under the action of torque impulses and other forces inherent in its operation about an axis of oscillation 18. It will be noted that this axis of oscillation 18 is inclined downwardly and rearwardly with respect to the axis 13 of the power shaft, the axis of oscillation preferably intersecting the axis 13 rearwardly of the engine in the vicinity of the transmission 12 and preferably adjacent the rear thereof as generally indicated at 19.

We preferably provide a flexible or yielding rear supporting structure B of suitable type for the power plant, and this supporting structure may or may not be inclined from a plane perpendicular to the axis 13 of the power shaft and lying substantially in a plane perpendicular to the axis of oscillation 18 preferably at the point 19. Referring to Fig. 3 we have illustrated in detail one manner of providing such a support, by reason of a cross frame member 20 extending between the main side frame members 15 and 16. The cross member 20 carries a saddle 21 having an arcuate upper face 22 adapted to receive an arcuate segment of resilient material 23 preferably formed of rubber composition. Surrounding the shaft 14 at the rear of the transmission 12 is a sleeve 24, the shaft 14 rotating within this sleeve. The upper and lower curved faces of the rubber segment 23 has vulcanized thereto the metal strips 26 and 25 respectively, these strips being respectively secured to the sleeve 24 and saddle 21, the latter being attached to the cross member 20 by the fasteners 27. The plane X—X extends substantially perpendicular through the point 19 containing the axis of oscillation 18, and it will be noted that this plane substantially includes the rear support B for the power plant.

Referring to Figs. 1 and 2, we have shown a similar front supporting structure for the engine power plant as generally indicated by reference character C. This structure includes a cross frame member 28 extending laterally between the frame members 15 and 16 and suitably secured thereto. The cross member 28 is provided with a saddle 21' to which is secured the metal strip 25' vulcanized to the rubber segmental pad 23', the latter being vulcanized to the strip 26' carried by the collar 24' suitably mounted on engine 10 as by the projection 29. Thus the yielding support C at the front of engine 10 may be generally similar to the yielding rear support B. If desired, the mountings B and C may be inclined from a plane perpendicular with the axis 13 of the power plant shaft, so as to lie substantially in planes perpendicular with the axis of oscillation 18, such planes being generally represented by the section lines 3—3 and 2—2 respectively of Fig. 1. While such arrangement is deemed of advantage in combination with our improvements, any form or positioning of the engine mountings may be used as desired or found expedient.

Referring to Figs. 1 and 4 we have disclosed one manner of securing the torque reaction absorbing weights to the power plant. Thus, one or more arms 30 may be carried by the flywheel housing 11 projecting laterally therefrom and carrying a weight or mass D at the end of each arm. The centers of gravity of the weights D preferably, though not necessarily, act about the axis of oscillation 18, Fig. 4 representing this condition by reason of the line 31 including these centers of gravity substantially intersecting the axis 18. These weights D preferably operate closely to the frame members 15 and 16 so as to be as far as possible from the axis of oscillation 18 of the power plant.

Throughout the specification and claims, we use the term "power plant", "power unit" or equivalent term in its broad sense as including an engine or other prime mover, with or without the cooperating accessories such as the clutch 11 and transmission 12.

According to our invention, it will be apparent that the engine power plant A tends to oscillate under the action of forces, largely torque reaction, inherent in its operation, about the axis of oscillation 18. By reason of the weights D, the rotary inertia of the power plant is increased so as to absorb the inherent torque reactions without appreciable amplitude, the rubber blocks incorporated with the front and rear supports yielding sufficiently to exercise a damping influence when the power plant is subjected to vibrations or tendency toward movement. It will be further apparent that our yielding supports also permit a limited amount of vertical and lateral movements of the power plant which is deemed advisable.

We desire to point out that we do not limit our invention to the particular details and constructions of parts described, since other modifications will readily suggest themselves within the scope of our invention and from my foregoing disclosure.

What we claim as our invention is:

1. In a motor vehicle having a power plant and supporting structure therefor, said power plant being subject to oscillating tendency about an axis extending longitudinally thereof under the action of forces inherent in its operation, means for mounting said power plant on said supporting structure constructed and arranged to provide for said oscillation, and a weight rigidly carried by the power plant adapted to increase the rotary inertia of the power plant about said axis, said weight having a mass sufficient to substantially absorb the inherent torque reactions, said weight being positioned relatively remotely from said axis.

2. In a motor vehicle having a power plant and supporting structure therefor, said power plant being subject to oscillating tendency about an axis extending longitudinally thereof under the action of forces inherent in its operation, means for mounting said power plant on said supporting structure constructed and arranged to provide for said oscillation, and a weight rigidly carried by the power plant adapted to increase the rotary inertia of the power plant about said axis, said weight having a mass sufficient to substantially absorb the inherent torque reactions, said weight being positioned laterally of said power plant adjacent said supporting structure.

3. In a motor vehicle having a power plant and supporting frame therefor, said power plant being subject to oscillating tendency under the action of forces inherent in its operation, means for mounting said power plant on said frame constructed and arranged to provide for said oscillation, a pair of weights in substantial balance secured to said power plant for increasing the normal rotary inertia thereof in opposition to said forces.

4. In a motor vehicle having a power plant and supporting structure therefor, said power plant being subject to oscillating tendency about an axis extending longitudinally thereof under the action of forces inherent in its operation, means for mounting said power plant on said supporting structure, constructed and arranged to provide for said oscillation, and a pair of weights carried by the power plant for increasing the normal rotary inertia thereof, said weights being positoned whereby a line through their centers of mass passes in the vicinity of said axis.

5. In a motor vehicle having a power plant and supporting structure therefor, said power plant being subject to oscillating tendency about an axis extending longitudinally thereof under the action of forces inherent in its operation, means for mounting said power plant on said supporting structure, constructed and arranged to provide for said oscillation, and a pair of weights rigidly carried by the power plant for increasing the normal rotary inertia thereof, said weights being positioned whereby a line through their centers of mass passes in the vicinity of said axis, said weights being positioned relatively remotely from said axis and adjacent said frame, the centers of mass of said weights being spaced laterally from said power plant.

6. In a motor vehicle unitary power plant including an engine and transmission, said motor vehicle having a frame, said power plant being subject to oscillating tendency about a longitudinal axis extending at an angle to the driveshaft of the power plant under the action of forces inherent in its operation, means for mounting said power plant on said frame constructed and arranged to provide for oscillatory movement of the power plant about said axis in response to said forces, said mounting means including a yielding support rearwardly of said transmission lying substantially in a vertical plane containing said axis of oscillation and a yielding supporting structure forwardly of said engine, said axis of oscillation containing the approximate center of gravity of said power plant, and a pair of weights in substantial balance connected to said power plant, said weights having a mass sufficient to substantially absorb said forces by a substantial increase in the rotary inertia of said power plant about said axis of oscillation.

ANDRE J. MEYER.
HAROLD H. TIMIAN.